United States Patent
Mundt et al.

(10) Patent No.: US 9,437,250 B2
(45) Date of Patent: Sep. 6, 2016

(54) HARD DRIVE CARRIER THAT LOCKS IN A SHIPPING POSITION

(71) Applicant: Dell Products, LP, Round Rock, TX (US)

(72) Inventors: Kevin W. Mundt, Austin, TX (US); Jared Terry, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 248 days.

(21) Appl. No.: 14/169,654

(22) Filed: Jan. 31, 2014

(65) Prior Publication Data
US 2015/0223364 A1    Aug. 6, 2015

(51) Int. Cl.
*G11B 33/12* (2006.01)

(52) U.S. Cl.
CPC ........... *G11B 33/124* (2013.01); *G11B 33/121* (2013.01); *G11B 33/125* (2013.01); *G11B 33/128* (2013.01); *G11B 33/123* (2013.01); *G11B 33/127* (2013.01)

(58) Field of Classification Search
CPC ............... H05K 7/1488; H05K 7/16; H05K 5/0226–5/23
See application file for complete search history.

(56) References Cited

U.S. PATENT DOCUMENTS

| | | | | |
|---|---|---|---|---|
| 4,633,350 A * | 12/1986 | Hanson | ................. | G11B 25/043 360/86 |
| 4,729,614 A * | 3/1988 | Nadler | ................. | H05K 5/0208 109/49.5 |
| 4,962,303 A * | 10/1990 | Chu | ................. | H01L 27/14649 250/208.1 |
| 5,652,695 A | 7/1997 | Schmitt | | |
| 5,868,261 A * | 2/1999 | Collins | ................. | H05K 7/1409 211/26 |
| 6,247,944 B1 * | 6/2001 | Bolognia | ................. | G06F 1/184 439/157 |
| 6,272,005 B1 * | 8/2001 | Jensen | ................. | G06F 1/184 312/223.1 |
| 6,325,353 B1 * | 12/2001 | Jiang | ................. | G06F 1/184 248/682 |
| 6,407,913 B1 | 6/2002 | Peachey et al. | | |
| 6,450,597 B1 * | 9/2002 | Bell | ................. | G06F 1/181 211/41.12 |
| 6,487,271 B1 * | 11/2002 | Laurent | ................. | G06T 5/50 378/98.7 |
| 6,600,648 B2 * | 7/2003 | Curlee | ................. | G06F 1/184 312/334.7 |
| 6,636,422 B1 * | 10/2003 | Tanzer | ................. | G11B 33/022 312/332.1 |
| 6,661,651 B1 * | 12/2003 | Tanzer | ................. | G06F 1/187 248/581 |
| 6,876,547 B2 | 4/2005 | McAlister | | |
| 7,139,166 B2 | 11/2006 | Marcade et al. | | |
| 7,200,008 B1 | 4/2007 | Bhugra | | |
| 7,251,132 B1 * | 7/2007 | Paul | ................. | G06F 1/187 248/618 |
| 7,280,352 B2 | 10/2007 | Wilson et al. | | |
| 7,321,489 B2 | 1/2008 | McAlister | | |
| 7,362,566 B1 | 4/2008 | Sivertsen | | |
| 7,551,427 B1 * | 6/2009 | Blaugrund | ................. | G06F 1/187 361/679.33 |
| 7,570,484 B1 * | 8/2009 | Sivertsen | ................. | G11B 33/125 361/679.37 |
| 7,948,748 B1 * | 5/2011 | Sivertsen | ................. | G11B 33/125 361/679.33 |
| 8,035,961 B2 | 10/2011 | Figuerado et al. | | |
| 8,339,780 B2 | 12/2012 | Terwilliger et al. | | |

(Continued)

*Primary Examiner* — Jeremy C Norris
*Assistant Examiner* — Muhammed Azam
(74) *Attorney, Agent, or Firm* — Larson Newman, LLP

(57) ABSTRACT

A hard drive carrier includes a frame to receive a hard drive. The frame includes a front and a side, and a handle connects to the front. The hard drive carrier engages with a hard drive bay to hold the hard drive carrier in the hard drive bay at a first insertion depth when the handle is in a closed position. The first insertion depth is selected to prevent a hard drive connector from engaging with an enclosure connector on a backplane of the hard drive bay. The hard drive carrier further engages with the hard drive bay to hold the hard drive carrier at a second insertion depth when the handle is in the closed position. The second insertion depth is selected to engage the hard drive connector with the enclosure connector.

18 Claims, 15 Drawing Sheets

(56) References Cited

U.S. PATENT DOCUMENTS

| | | | |
|---|---|---|---|
| 8,611,093 B2 | 12/2013 | Terwilliger et al. | |
| 2003/0011979 A1* | 1/2003 | Tanzer | G06F 1/187 361/679.33 |
| 2003/0081378 A1* | 5/2003 | Debbins | G11B 33/022 361/679.33 |
| 2003/0217461 A1* | 11/2003 | McTague | G11B 33/121 29/714 |
| 2005/0237707 A1* | 10/2005 | Connelly, Jr. | G11B 33/128 361/679.36 |
| 2005/0270737 A1* | 12/2005 | Wilson | G06F 1/184 361/679.37 |
| 2006/0056146 A1* | 3/2006 | Marcade | G11B 33/12 361/679.32 |
| 2006/0245157 A1* | 11/2006 | Aaron | G11B 33/12 361/679.37 |
| 2007/0014085 A1* | 1/2007 | Meserth | G06F 1/184 361/679.35 |
| 2007/0047194 A1* | 3/2007 | Tsai | G06F 1/187 361/679.32 |
| 2007/0064385 A1* | 3/2007 | Paul | G06F 1/20 361/679.4 |
| 2007/0127202 A1* | 6/2007 | Scicluna | G06F 1/184 361/679.37 |
| 2008/0013272 A1* | 1/2008 | Bailey | G06F 1/187 361/679.33 |
| 2008/0137277 A1* | 6/2008 | Mundt | H01R 13/5829 361/679.01 |
| 2008/0158810 A1* | 7/2008 | Liu | G11B 33/124 361/679.33 |
| 2008/0298004 A1* | 12/2008 | Bailey | H05K 7/1454 361/679.01 |
| 2009/0273896 A1* | 11/2009 | Walker | G06F 1/187 361/679.33 |
| 2011/0080705 A1* | 4/2011 | Figuerado | G06F 1/187 361/679.33 |
| 2012/0243172 A1* | 9/2012 | Ross | G06F 1/187 361/679.37 |
| 2013/0176676 A1* | 7/2013 | Keffeler | H05K 7/1487 361/679.37 |
| 2014/0049897 A1* | 2/2014 | Hoss | G06F 1/187 361/679.31 |
| 2014/0125209 A1* | 5/2014 | Kyle | G06F 1/183 312/317.1 |
| 2014/0168891 A1* | 6/2014 | Mundt | G06F 1/188 361/679.58 |
| 2016/0103469 A1* | 4/2016 | Kyle | G06F 1/16 361/679.58 |

* cited by examiner

HARD DRIVE CARRIER THAT LOCKS IN A SHIPPING POSITION

FIELD OF THE DISCLOSURE

This disclosure generally relates to information handling systems, and more particularly relates to a hard drive carrier that locks in a shipping position.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system, such as a server or a storage system can include a number of system enclosures. The system enclosures can hold multiple hard drives, which are typically installed in the system enclosures prior to shipping to the customer. The hard drives are connected to a backplane of the system enclosure with, for example, a Serial Attached SCSI (SAS) connector.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
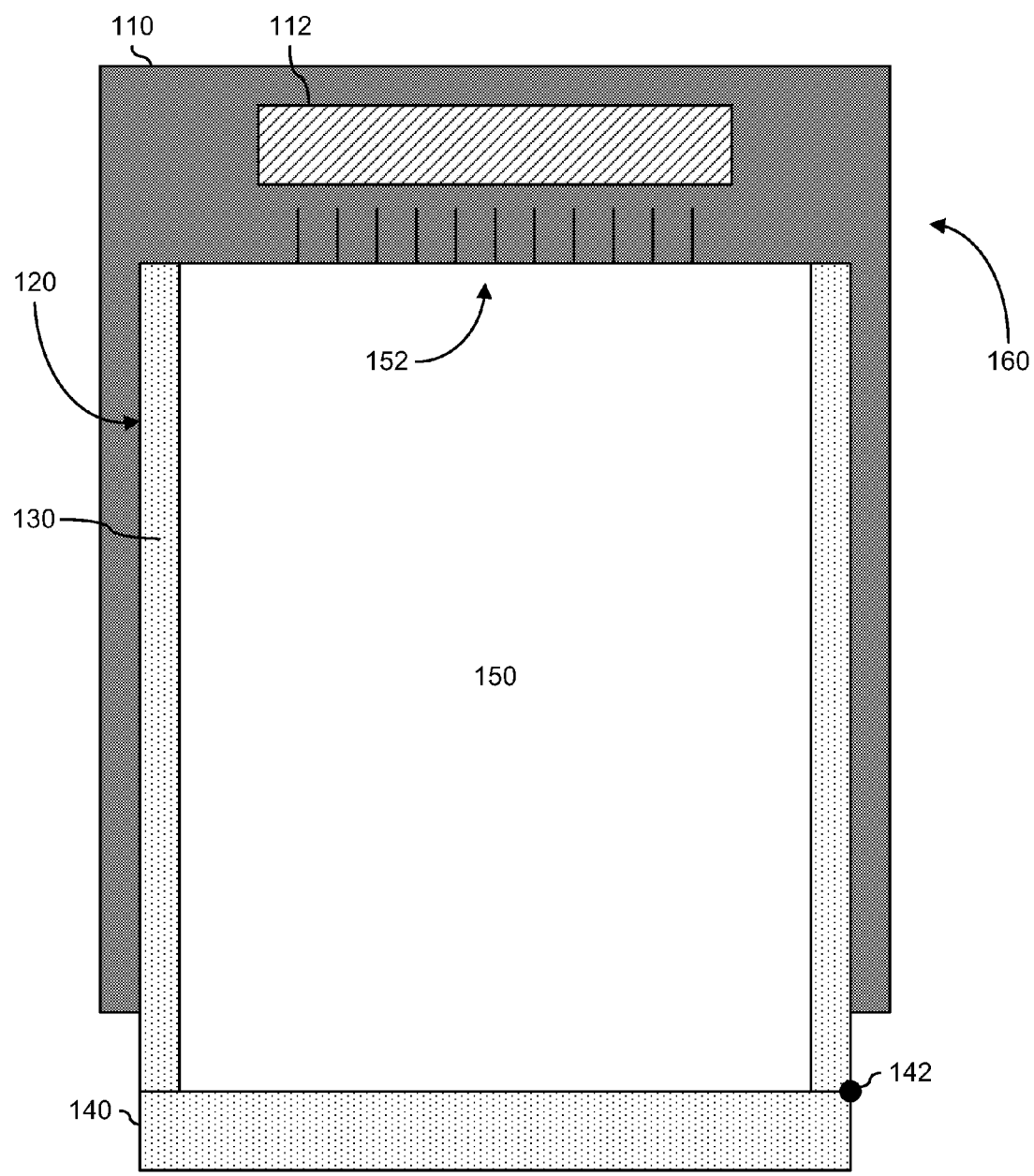
FIG. 1 is a diagram illustrating a hard drive bay and a hard drive carrier locked in a shipping position in a hard drive enclosure according to an embodiment of the present disclosure.

FIG. 1 shows a hard drive bay 100 for an information handling system according to an embodiment of the present disclosure. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The hard drive bay 100 includes a hard drive enclosure 110 and a hard drive carrier 120. The hard drive enclosure 110 includes an enclosure connector 112. The hard drive carrier 120 includes a hard drive frame 130, a handle 140, and a hard drive 150. The handle 140 includes a hinge 142 that connects the handle 140 to the hard drive frame 130. The hard drive 150 includes a hard drive connector 152. The enclosure connector 112 is connected to a backplane of the information handling system, and operates to receive the hard drive connector, when the hard drive carrier 120 is in an operating position, as described below. In this way, the data storage functions of the hard drive 150 are provided to the information handling system.

The hard drive frame 130 and the handle 140 are utilized to insert the hard drive carrier 120 in to the hard drive enclosure 110 to a first insertion depth and to lock the hard drive carrier 120 in a shipping position 160 in the hard drive enclosure 110. When the hard drive carrier 120 is locked in the shipping position 160, the hard drive connector 152 is prevented from coming in to physical contact with the enclosure connector 112, as shown in FIG. 1. In a particular embodiment, where the enclosure connector 112 is a surface mount connector, the shipping position 160 prevents the surface mount connector from experiencing the mechanical strain from shipping. In another embodiment, the enclosure connector 112 is a through-hole connector. The hinge 142 allows the handle 140 to be moved between an open and a closed position. The hard drive frame 130 and the handle 140 include a locking mechanism (not shown), such that the handle 140 can be locked in the closed position, as shown in FIG. 1. In an embodiment, the locking mechanism is a push/push trigger lock, such that the lock can lock and unlock the handle 140 based on a recursive depression of the lock.

Figure 2:
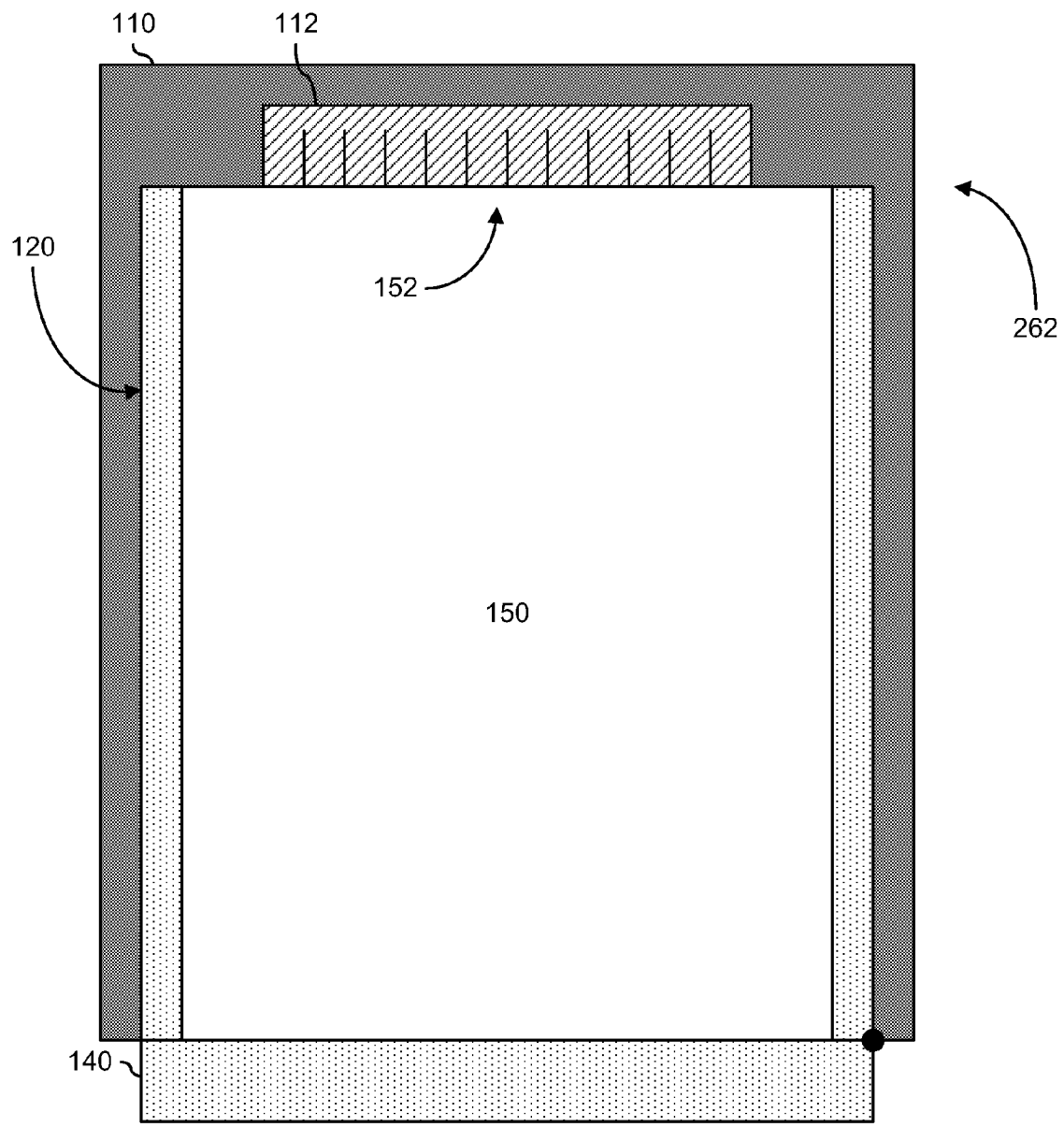
FIG. 2 is a diagram illustrating the hard drive bay and the hard drive carrier locked in an operating position in the hard drive enclosure of FIG. 1.

FIG. 2 shows the hard drive bay 100 and the hard drive carrier 120 locked in an operating position 262 in the hard drive enclosure 110. When the hard drive carrier 120 is inserted in to the hard drive enclosure 110 to a second insertion depth andthe hard drive carrier 120 is locked in the operating position 262 in the hard drive enclosure 110, the hard drive connector 152 is connected to the enclosure connector 112. Thus, in the operating position 262, the data storage functions of the hard drive 150 are provided to the information handling system.

Figure 3:
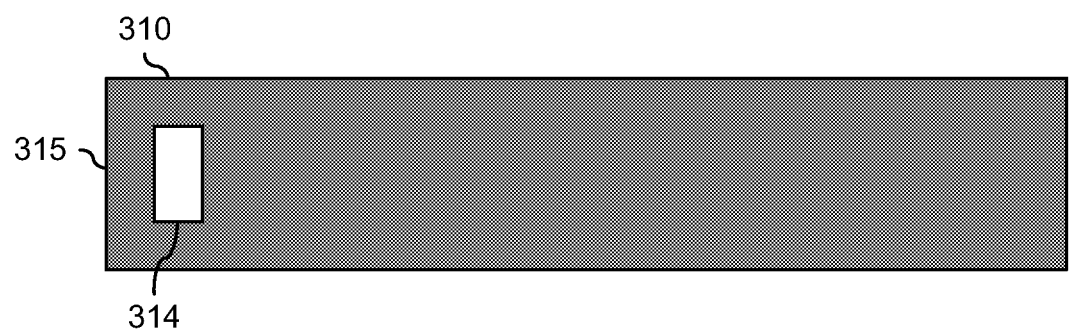
FIG. 3 is a diagram illustrating a side view of a hard drive enclosure according to an embodiment of the present disclosure.

FIG. 3 shows a side view of a hard drive enclosure 310, similar to hard drive enclosure 110. The hard drive enclosure 310 includes a retention opening 314 and a front surface 315. In a particular embodiment, retention opening 314 is used to provide a mechanism for locking a hard drive carrier into a shipping position, and in to an operating position, as described below.

Figure 4:
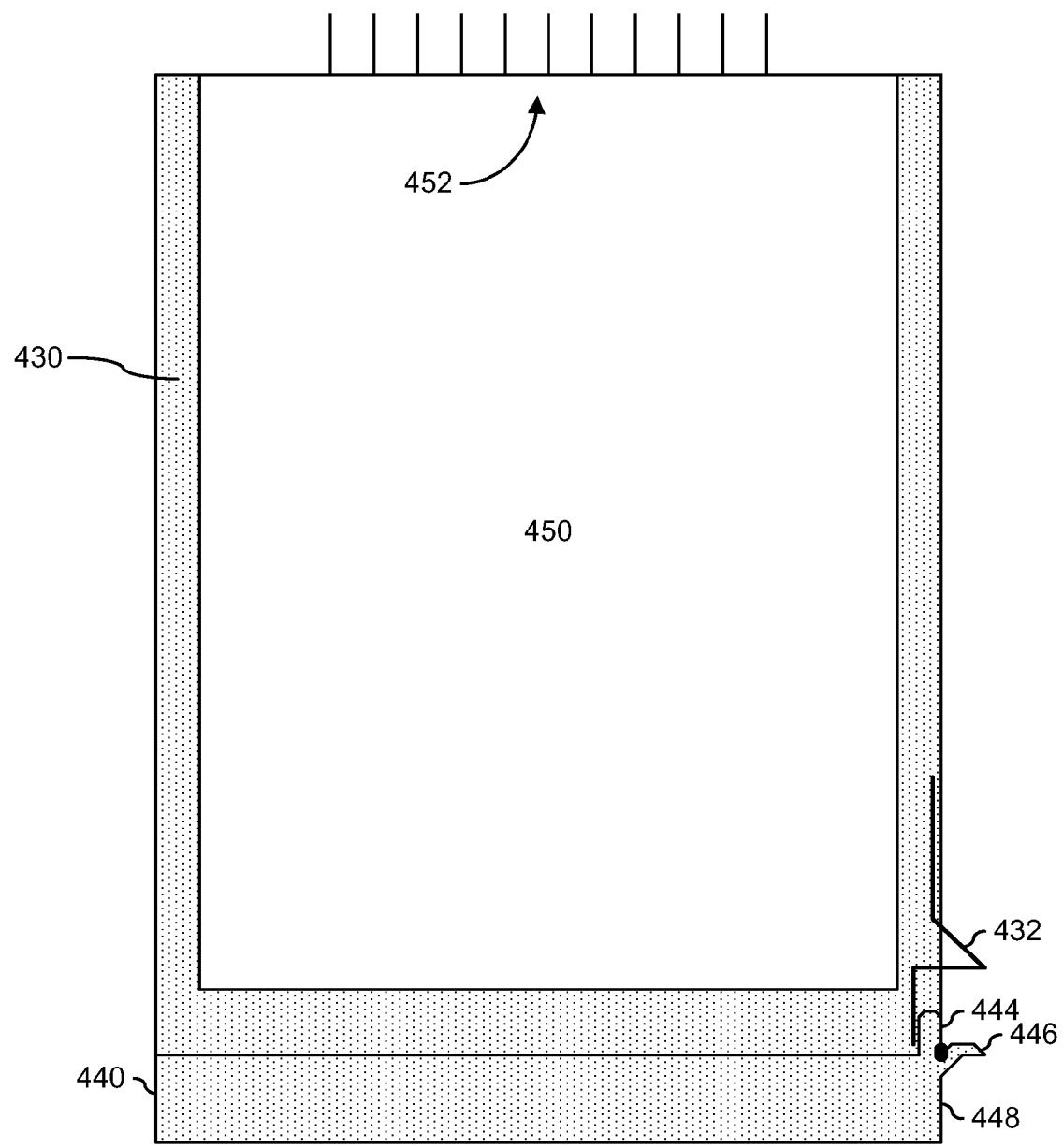
FIG. 4 is a diagram illustrating a hard drive carrier according to an embodiment of the present disclosure.

FIG. 4 shows a hard drive carrier 420 similar to hard drive carrier 120, including a hard drive frame 430, a handle 440, and a hard drive 450. The hard drive frame 430 includes a frame latch 432 connected to a side of the hard drive frame 430. The handle 440 is connected to the front of the hard drive frame 430, and includes a lever 444, a handle latch 446, and an extraction surface 448. The hard drive 450 includes a hard drive connector 452.

Figure 5:
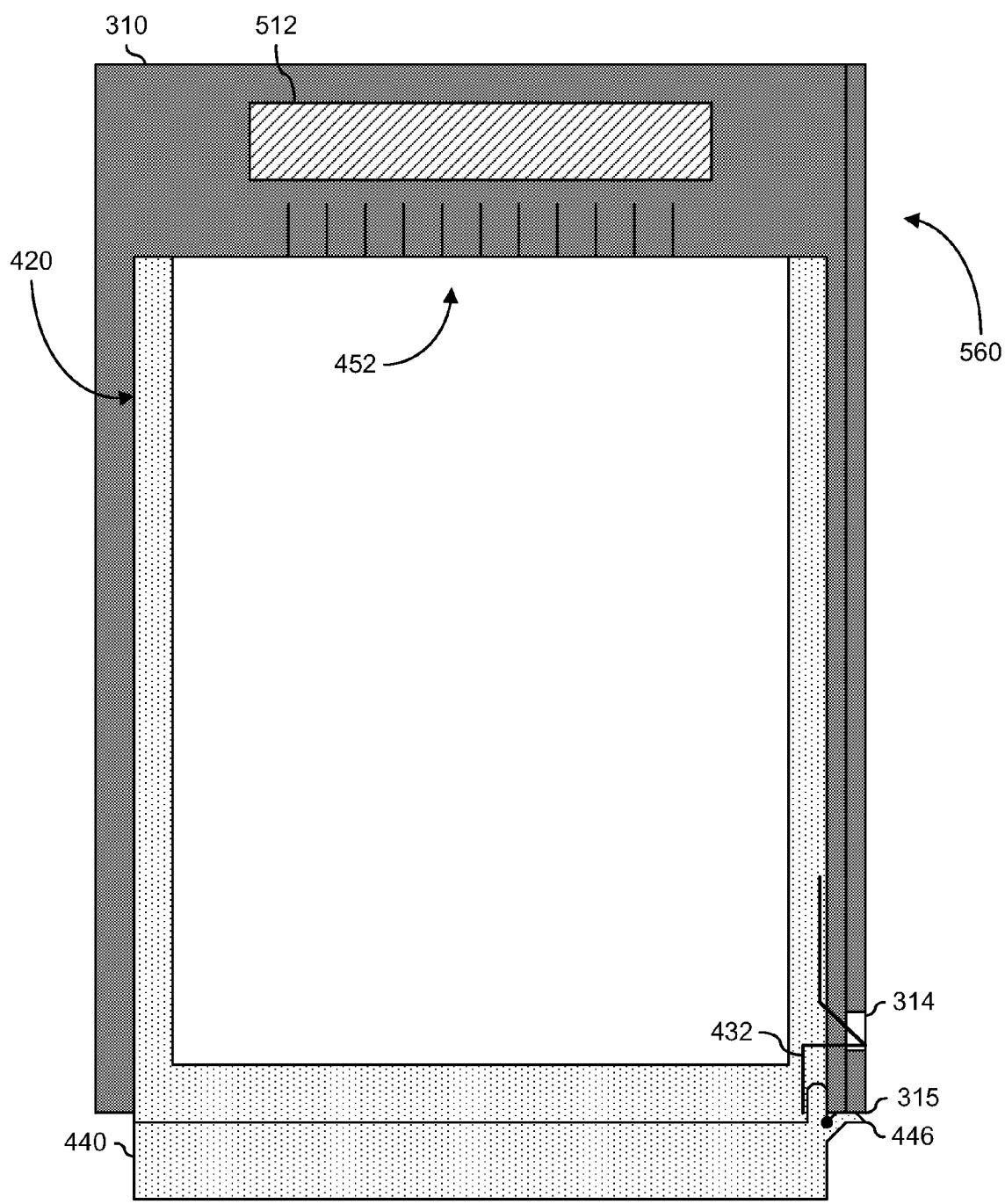
FIG. 5 is a diagram illustrating a hard drive bay and the hard drive carrier of FIG. 4 locked in a shipping position in the hard drive enclosure of FIG. 3.

FIG. 5 shows a hard drive bay 500 including hard drive enclosure 310 and the hard drive carrier 420. The hard drive carrier 420 is shown locked in a shipping position 560 in the hard drive enclosure 310. The hard drive carrier 420 is inserted and slid in to the hard drive enclosure 310 to a first insertion depth. When the handle 440 of the hard drive carrier 420 is moved to the closed and locked position, the frame latch 432 engages with the retention opening 314 of the hard drive enclosure 310, and the back of the handle latch 446 engages with the front surface 315 of the hard drive enclosure 310, locking the hard drive carrier 420 in the shipping position 560 in the hard drive enclosure 310. In this position, the handle latch 446 acts as a travel stop and prevents the hard drive carrier 420 from being inserted to an insertion depth greater than the first insertion depth. At the first insertion depth, the hard drive connector 452 is prevented from coming in to physical contact with an enclosure connector 512. In an embodiment, the frame latch 432 is a sheet metal spring clip, as shown in FIG. 5. In another embodiment, the frame latch 432 is a plunger, a sliding pin, and the like, and may allow the first insertion depth to be less than with the sheet metal spring clip. In an embodiment, the retention mechanism of the hard drive enclosure 310 is the retention opening 314, as shown in FIG. 5. In another embodiment, the retention mechanism of the hard drive enclosure 310 is a retention recess that the frame latch 432 snap-fits in to.

Figure 6:
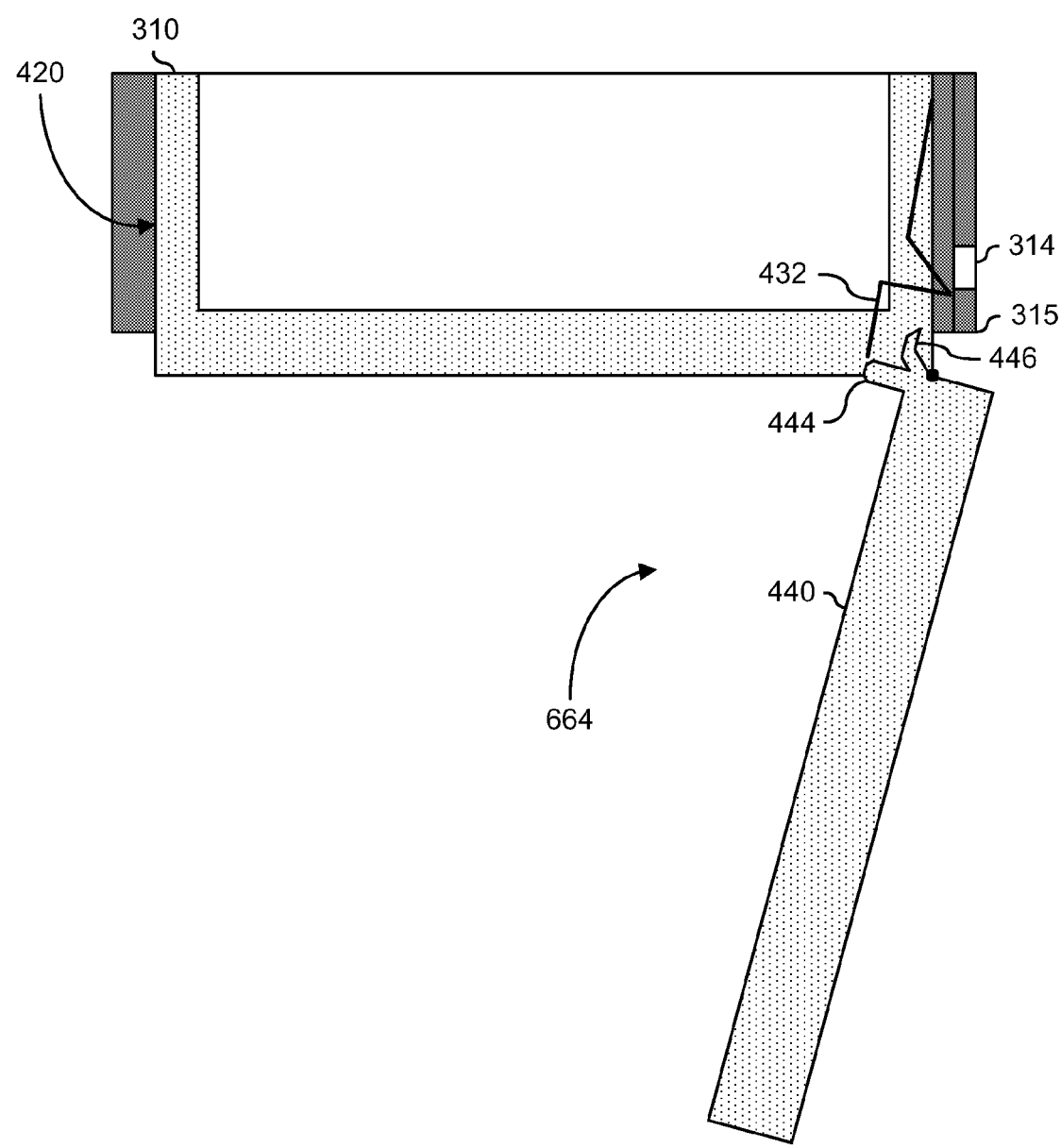
FIG. 6 is a diagram illustrating a partial view of the hard drive bay of FIG. 5 and the hard drive carrier of FIG. 4 in a latch open position in the hard drive enclosure of FIG. 3.

FIG. 6 shows a partial view of the hard drive bay 500 and the hard drive carrier 420 in a latch open position 664 in the hard drive enclosure 310. In an embodiment, the handle 440 is released from the lock and opened by the user pressing on the handle 440 and releasing the handle 440. When the handle 440 is opened, the handle latch 446 disengages with the front surface 315 of the hard drive enclosure 310 and moves to a retracted open position, and the lever 444 engages with the frame latch 432 causing the frame latch 432 to disengage from the retention opening 314 and move to a retracted open position, placing the hard drive carrier 420 in the latch open position 664. When the hard drive carrier 420 is in the latch open position 664, the hard drive carrier 420 is moved further in to the hard drive enclosure 310. The hard drive carrier 420 can also be pulled out and removed from the hard drive enclosure 310, when the hard drive carrier 420 is in the latch open position 664.

Figure 7:
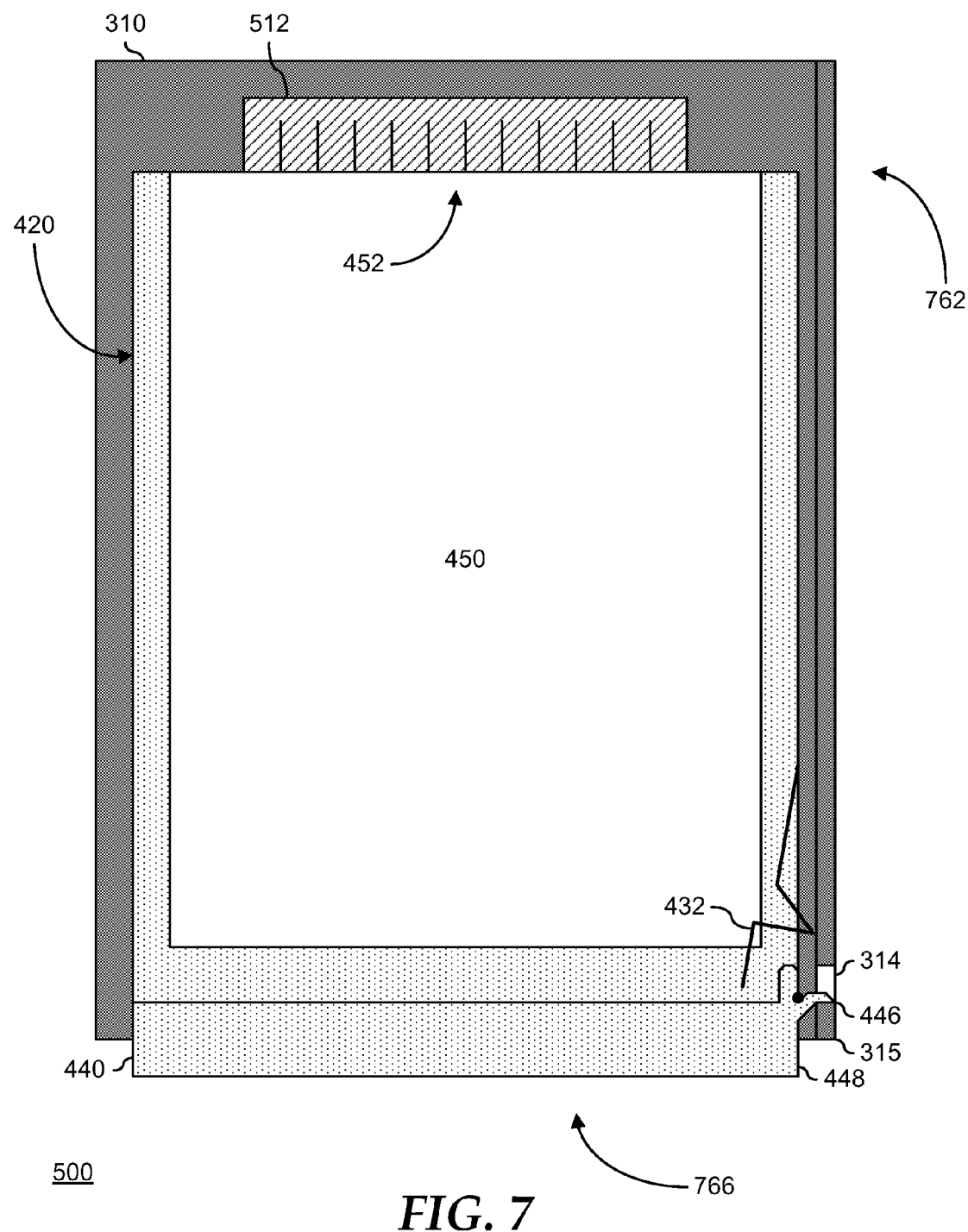
FIG. 7 is a diagram illustrating the hard drive bay of FIG. 5 and the hard drive carrier of FIG. 4 locked in an operating position in the hard drive enclosure of FIG. 3.

FIG. 7 shows the hard drive bay 500 and the hard drive carrier 420 locked in an operating position 762 in the hard drive enclosure 310. When the hard drive carrier 420 is in the latch open position 664 of FIG. 6, the hard drive carrier 420 is slid in to the hard drive enclosure 310 to a second insertion depth towards the enclosure connector 512 on the backplane of the hard drive enclosure 310. When the handle 440 is moved to the closed and locked position by exerting a force on the handle 440, the hard drive connector 452 of the hard drive 450 is connected to the enclosure connector 512 on the backplane and the handle latch 446 engages with the retention opening 314 and the hard drive carrier 420 is locked in a latch closed position 766 and the operating position 762 in the hard drive enclosure 310. When the hard drive carrier 420 is in the operating position 762, the frame latch 432 is held in the retracted and latch open position by a side of the hard drive enclosure 310.

The user releases the hard drive carrier 420 from the operating position 762 by pressing on the handle 440, which releases the handle 440 from the lock and releases the handle 440. When the handle 440 is moved to an open position by exerting an outward force on the handle 440, the handle latch 446 disengages from the retention opening 314 and moves to an open position, placing the hard drive carrier 420 in the latch open position 664 of FIG. 6. Opening the handle 440 also causes the extraction surface 448 of the handle 440 to engage with the front surface 315 of the hard drive enclosure 310, which creates an outward force on the hard drive carrier 420. The outward force on the hard drive carrier 420 causes the hard drive connector 452 of the hard drive 450 to disconnect from the enclosure connector 512, allowing the hard drive carrier 420 to move to the shipping position 560 of FIG. 5 or to be pulled out and removed from the hard drive enclosure 310.

Figure 8:
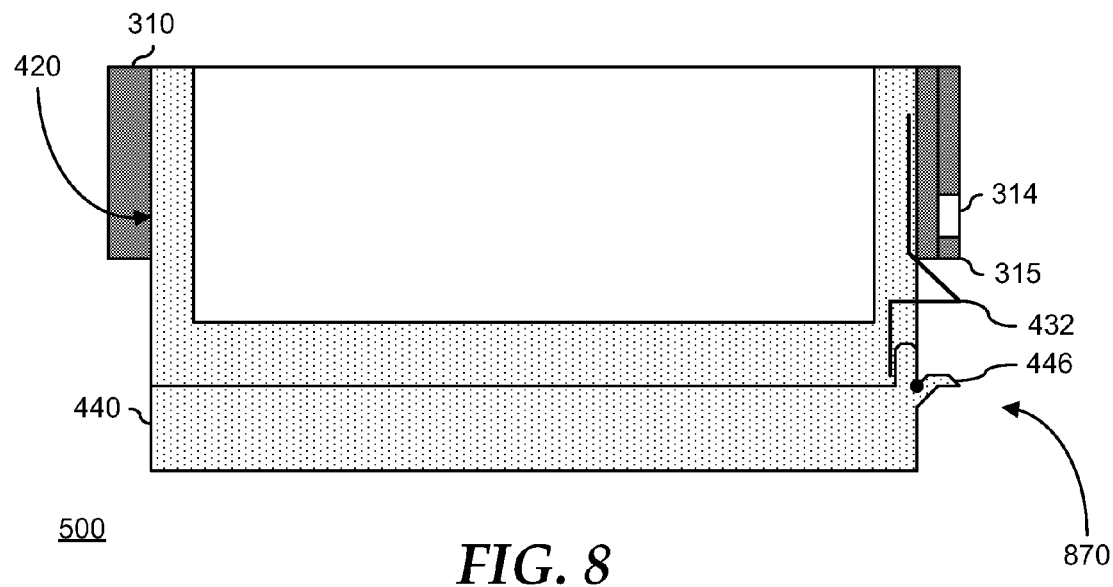
FIG. 8 is a diagram illustrating a partial view of the hard drive bay of FIG. 5 and the hard drive carrier of FIG. 4 in an uninstalled position in the hard drive enclosure of FIG. 3.

FIG. 8 shows a partial view of the hard drive bay 500 and the hard drive carrier 420 in an uninstalled position 870 in the hard drive enclosure 310. In another embodiment, the frame latch 432 has an angled lead in, such that the frame latch 432 is operated independently of the handle 440 and the handle latch 446. The hard drive carrier 420 is inserted in to the hard drive enclosure 310, with the handle 440 in the closed and locked position, to the uninstalled position 870. From the uninstalled position 870, the hard drive carrier 420 is installed to the shipping position 560 by exerting a force on the handle 440 causing the hard drive carrier 420 to slide in to the hard drive enclosure 310 and the frame latch 432 to move to a retracted position as the front surface 315 of the hard drive enclosure 310 engages and rides up the angled lead in of the frame latch 432. When the hard drive carrier 420 reaches the first insertion depth, the frame latch 432 will automatically snap to the retention opening 314 of the hard drive enclosure 310 and the hard drive carrier 420 will be locked in the shipping position 560 in the hard drive enclosure 310.

At the first insertion depth, the back of the handle latch 446 engages with the front surface 315 of the hard drive enclosure 310, such that the handle latch 446 acts as a travel stop and prevents the hard drive carrier 420 from being inserted to an insertion depth greater than the first insertion depth. The frame latch 432 is disengaged from the retention opening 314 in a similar way as previously described with reference to FIG. 6, allowing the hard drive carrier 420 to be moved to the operating position 762 of FIG. 7 or to be pulled out and removed from the hard drive enclosure 310.

Figure 9:
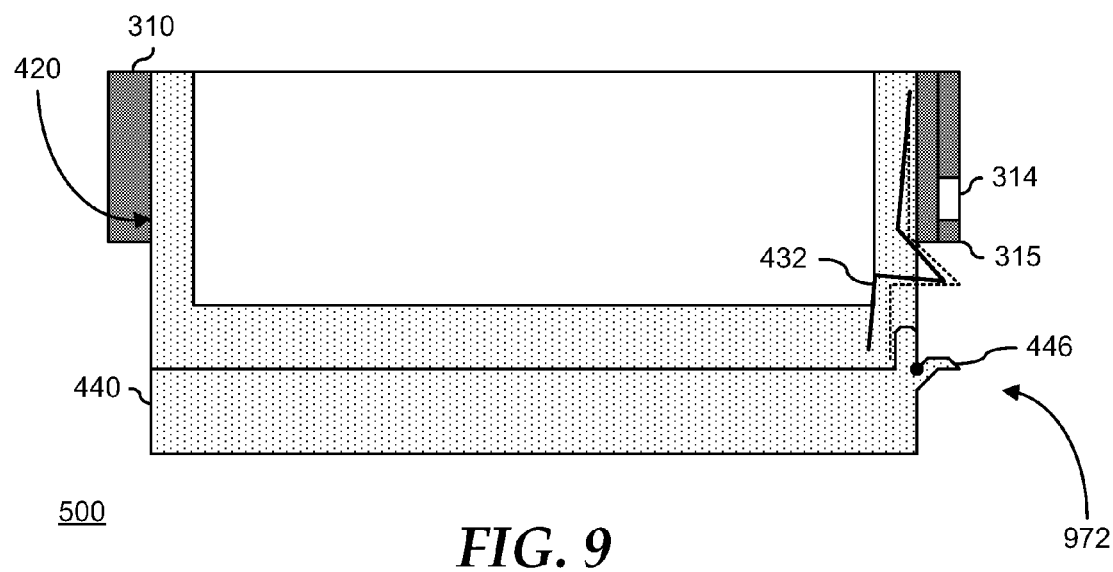
FIG. 9 is a diagram illustrating a partial view of the hard drive bay of FIG. 5 and the hard drive carrier of FIG. 4 in a partially installed position in the hard drive enclosure of FIG. 3.

FIG. 9 shows a partial view of the hard drive bay 500 and the hard drive carrier 420 in a partially installed position 972 in the hard drive enclosure 310. As shown, the hard drive carrier 420 starts in the uninstalled position 870 of FIG. 8, with the handle 440 in the closed and locked position. By exerting a force on the handle 440, the hard drive carrier 420 slides in to the hard drive enclosure 310 causing the frame latch 432 to start to retract as the front surface 315 of the hard drive enclosure 310 engages and rides up the angled lead in of the frame latch 432. As shown in FIG. 9, the hard drive carrier 420 is in the partially installed position 972 at an insertion depth before the hard drive carrier 420 reaches the first insertion depth, the frame latch 432 engages with the retention opening 314 of the hard drive enclosure 310, and the handle latch 446 engages with the front surface 315 of the hard drive enclosure 310.

Figure 10:
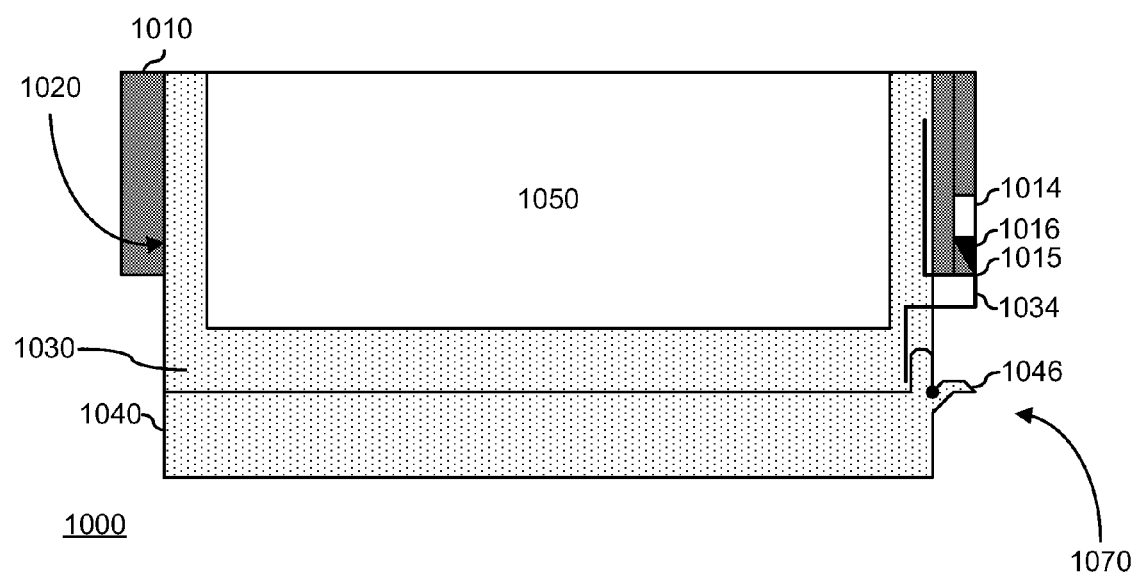
FIG. 10 is a diagram illustrating a partial view of a hard drive bay and a hard drive carrier in an uninstalled position in a hard drive enclosure according to a further embodiment of the present disclosure.

FIG. 10 shows a partial view of a hard drive bay 1000 similar to hard drive bay 500, including a hard drive carrier 1020 in an uninstalled position 1070 in a hard drive enclosure 1010. The hard drive enclosure 1010 includes a retention opening 1014, a front surface 1015, and a ramp 1016. The hard drive carrier 1020 includes a hard drive frame 1030, a handle 1040, and a hard drive 1050. The hard drive frame 1030 includes a frame latch 1034 connected to a side of the hard drive frame 1030. The handle 1040 is connected to a front of the hard drive frame 1030. The handle 1040 includes a handle latch 1046. The ramp 1016 of the hard drive enclosure 1010 allows the frame latch 1034 to operate independently of the handle 1040 and the handle latch 1046 without cycling the handle 1040. The hard drive carrier 1020 is inserted in to the hard drive enclosure 1010, with the handle 1040 in a closed and locked position, to the uninstalled position 1070. The hard drive carrier 1020 is installed to a shipping position similar to the shipping position 560 of FIG. 5 by exerting a force on the handle 1040 causing the hard drive carrier 1020 to slide in to the hard drive enclosure 1010 and the frame latch 1034 to move to a retracted position as the frame latch 1034 engages and rides up the ramp 1016 of the hard drive enclosure 1010. When the hard drive carrier 1020 reaches a first insertion depth, the frame latch 1034 will automatically snap to the retention opening 1014 of the hard drive enclosure 1010 and the hard drive carrier 1020 will be locked in the shipping position similar to the shipping position 560 in the hard drive enclosure 1010.

At the first insertion depth, the back of the handle latch 1046 engages with the front surface 1015 of the hard drive enclosure 1010, such that the handle latch 1046 acts as a travel stop and prevents the hard drive carrier 1020 from being inserted to an insertion depth greater than the first insertion depth. The frame latch 1034 can be disengaged from the retention opening 1014 in a similar way as previously described with reference to FIG. 6, allowing the hard drive carrier 1020 to be moved to an operating position similar to the operating position 762 of FIG. 7 or to be pulled out and removed from the hard drive enclosure 1010.

Figure 11:
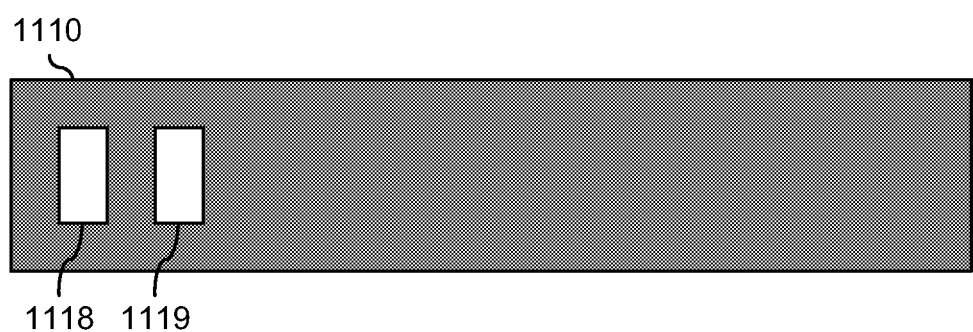
FIG. 11 is a diagram illustrating a side view of a hard drive enclosure according to yet another embodiment of the present disclosure.

FIG. 11 shows a side view of a hard drive enclosure 1110, similar to hard drive enclosure 310. The hard drive enclosure 1110 includes a first retention opening 1118, and a second retention opening 1119. In a particular embodiment, the first retention opening 1118 and the second retention opening 1119 are used to provide a mechanism for locking a hard drive carrier in to a shipping position, and in to an operating position, respectively, as described below.

Figure 12:
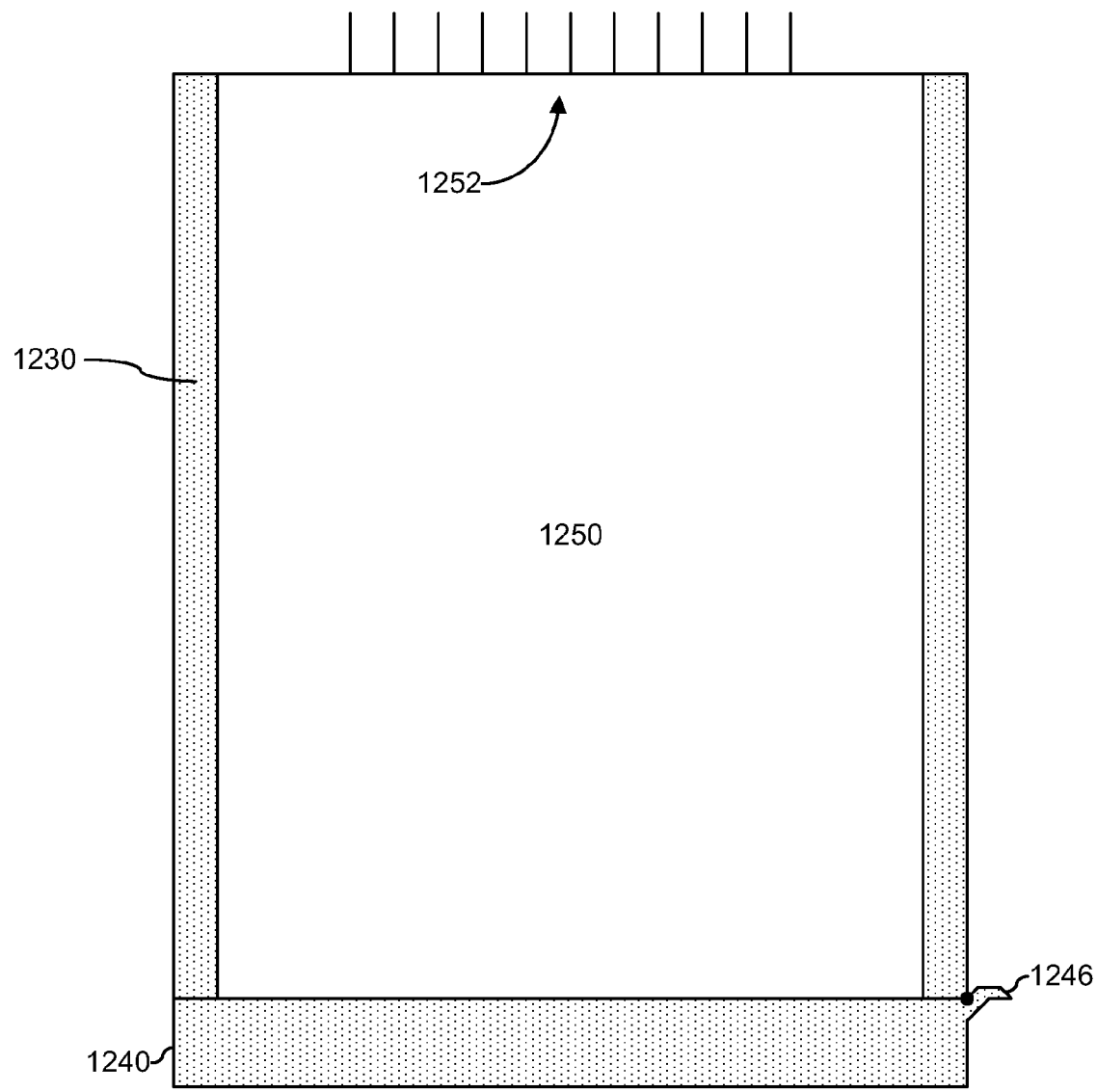
FIG. 12 is a diagram illustrating a hard drive carrier according to yet another embodiment of the present disclosure.

FIG. 12 shows a hard drive carrier 1220 similar to hard drive carrier 420, including a hard drive frame 1230, a handle 1240, and a hard drive 1250. The handle 1240 is connected to the front of the hard drive frame 1230, and includes a handle latch 1246. The hard drive 1250 includes a hard drive connector 1252.

Figure 13:
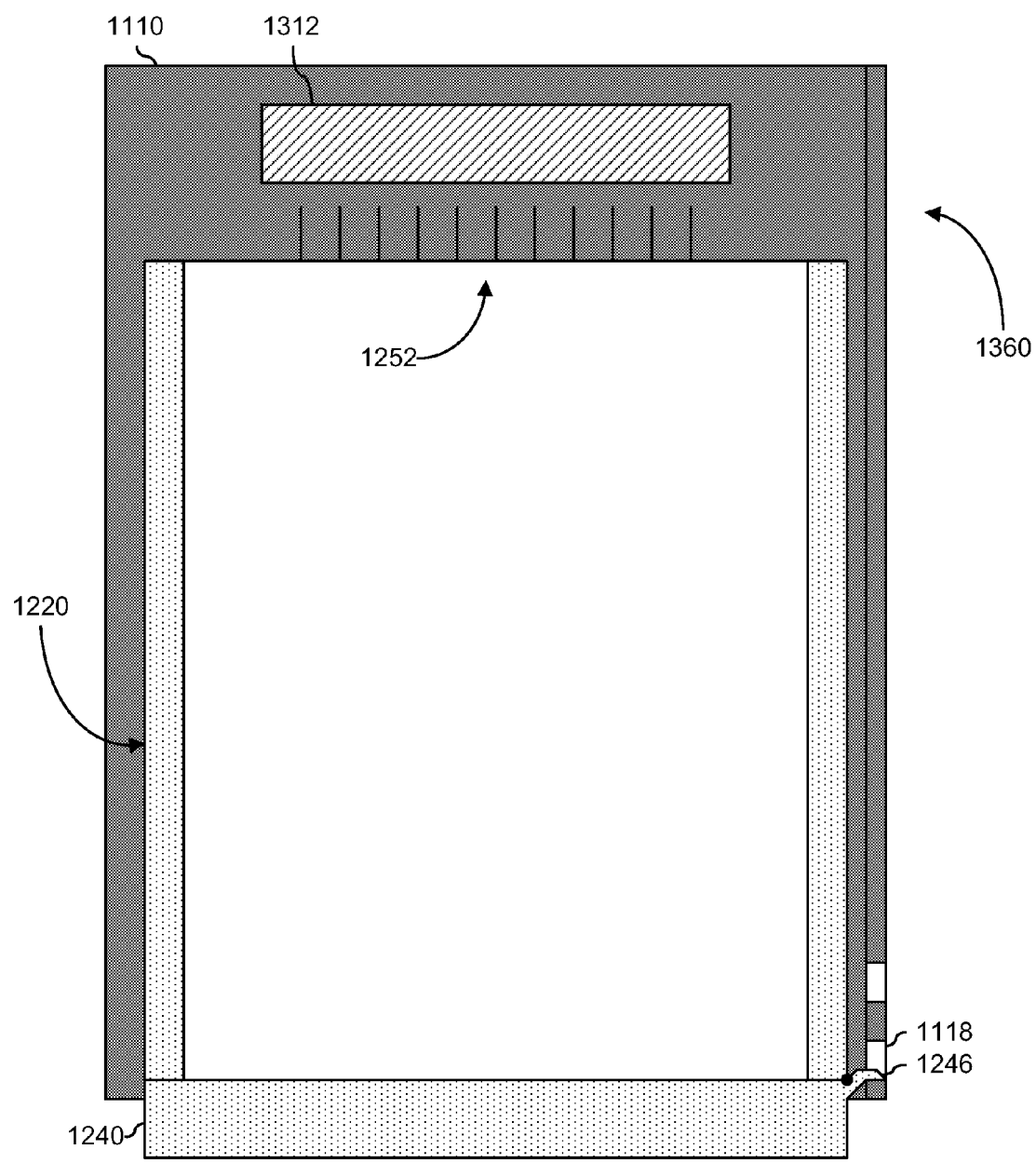
FIG. 13 is a diagram illustrating a hard drive bay and the hard drive carrier of FIG. 12 locked in a shipping position in the hard drive enclosure of FIG. 11.

FIG. 13 shows a hard drive bay 1300 including hard drive enclosure 1110 and the hard drive carrier 1220. The hard drive carrier 1220 is shown locked in a shipping position 1360 in the hard drive enclosure 1110. The hard drive carrier 1220 is inserted and slid in to the hard drive enclosure 1110 to a first insertion depth. When the handle 1240 of the hard drive carrier 1220 is moved to the closed and locked position, the handle latch 1246 engages with the first retention opening 1118 of the hard drive enclosure 1110, locking the hard drive carrier 1220 in the shipping position 1360 in the hard drive enclosure 1110. At the first insertion depth, the hard drive connector 1252 is prevented from coming in to physical contact with an enclosure connector 1312.

The handle latch 1246 is disengaged from the first retention opening 1118 in a similar way as described above with respect to FIG. 6, allowing the hard drive carrier 1220 to be moved to an operating position, as described below, or to be pulled out and removed from the hard drive enclosure 1110.

Figure 14:
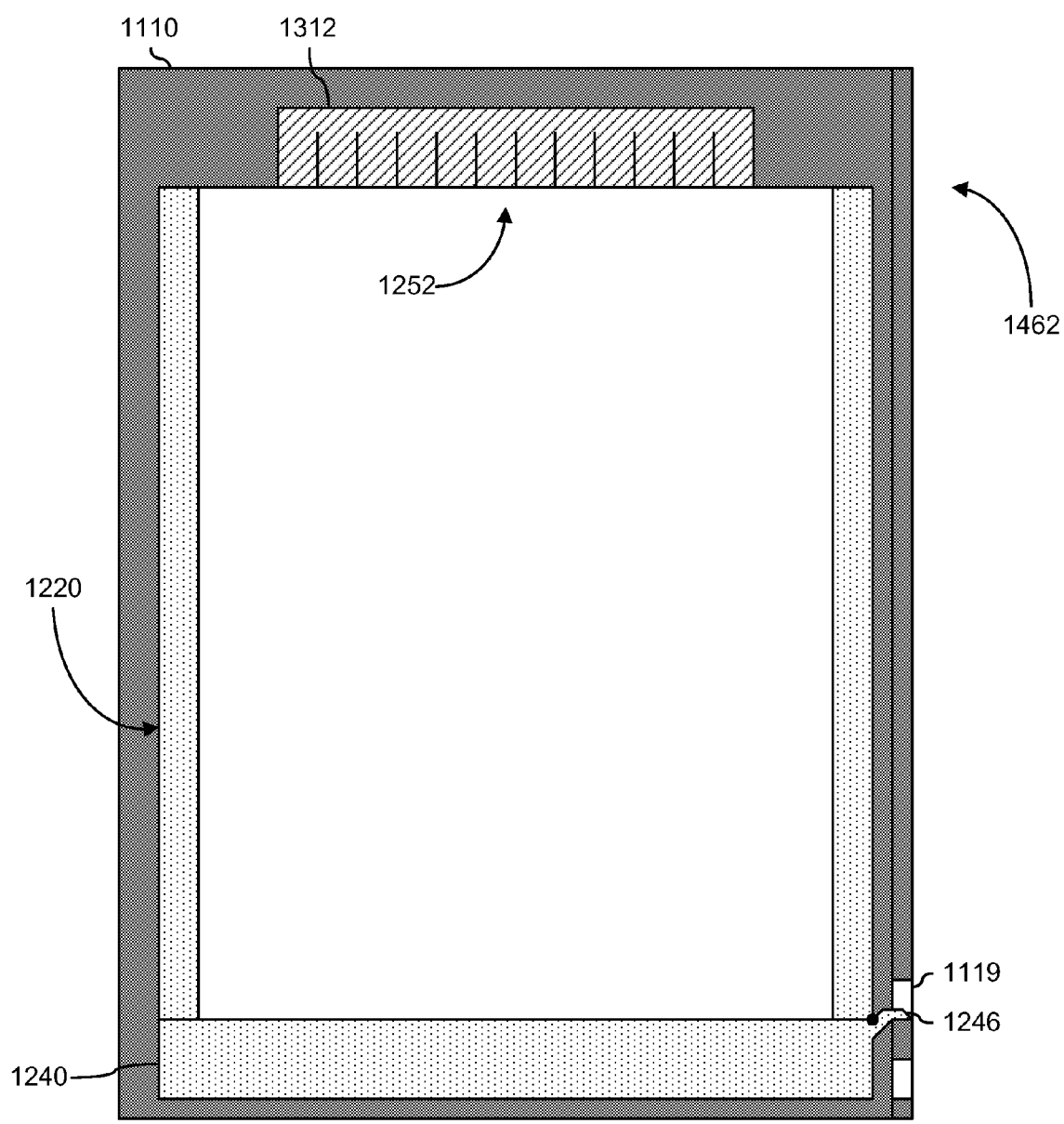
FIG. 14 is a diagram illustrating the hard drive bay of FIG. 13 and the hard drive carrier of FIG. 12 locked in an operating position in the hard drive enclosure of FIG. 11.

FIG. 14 shows the hard drive bay 1300 and the hard drive carrier 1220 locked in an operating position 1462 in the hard drive enclosure 1110. When the hard drive carrier 1220 is in a latch open position, similar to the latch open position 664 of FIG. 6, the hard drive carrier 1220 is slid in to the hard drive enclosure 1110 to a second insertion depth towards the enclosure connector 1312 on the backplane of the hard drive enclosure 1110. When the handle 1240 is moved to the closed and locked position by exerting a force on the handle 1240, the hard drive connector 1252 is connected to the enclosure connector 1312 on the backplane and the handle latch 1246 engages with the second retention opening 1119 and the hard drive carrier 1220 is locked in the operating position 1462 in the hard drive enclosure 1110.

The handle latch 1246 is disengaged from the second retention opening 1119 in a similar way as previously described with reference to FIG. 7, allowing the hard drive carrier 1220 to be moved to the shipping position 1360 or to be pulled out and removed from the hard drive enclosure 1110.

In an embodiment, the retention mechanisms of the hard drive enclosure 1110 that the handle latch 1246 engages are the first retention opening 1118 when the hard drive carrier 1220 is moved in to the shipping position 1360 and the second retention opening 1119 when the hard drive carrier 1220 is moved in to the operating position 1462, as shown in FIGS. 13 and 14. In another embodiment, the retention mechanisms of the hard drive enclosure 1110 is a first retention recess and a second retention recess that the latch 1246 snap-fits in to when the hard drive carrier 1220 is moved in to the shipping position 1360 and the operating position 1462, respectively.

Figure 15:
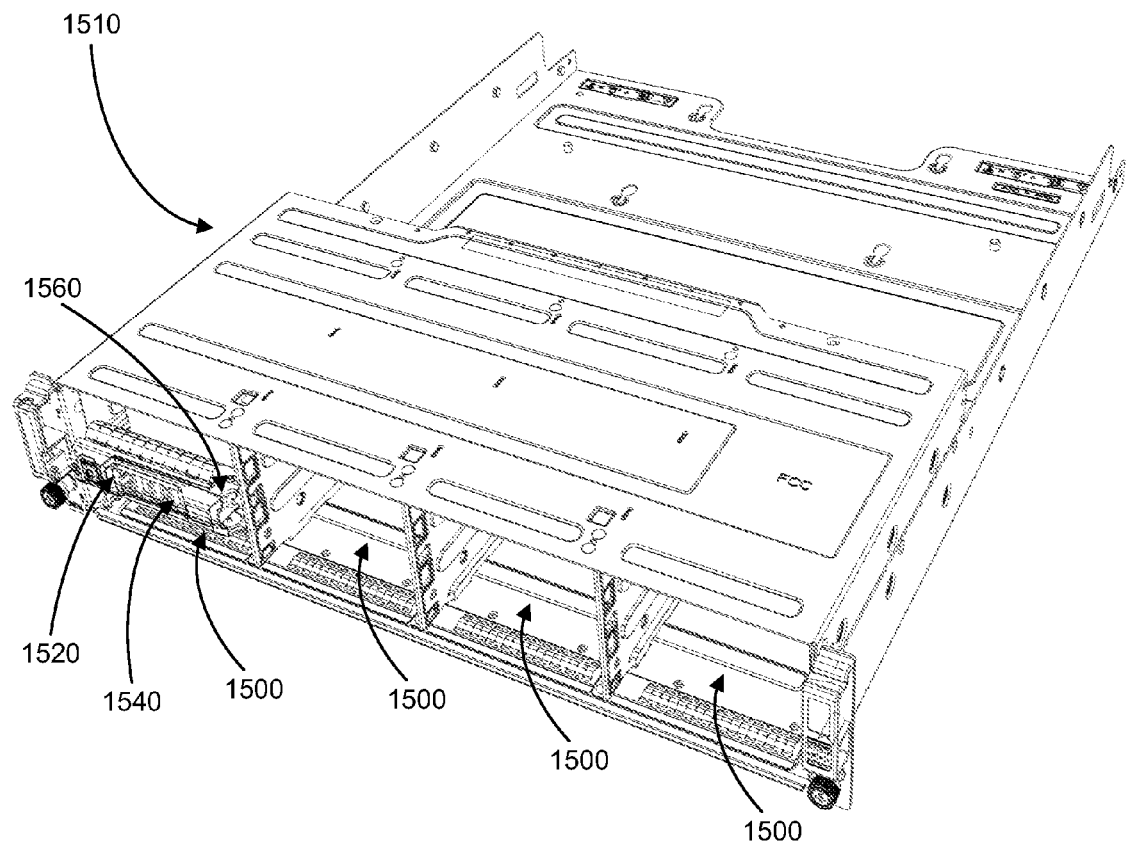
FIG. 15 is a diagram illustrating a perspective view of a system enclosure including a number of hard drive bays and a hard drive carrier locked in a shipping position in a hard drive enclosure of a hard drive bay according to yet a further embodiment of the present disclosure.

FIG. 15 shows a perspective view of a system enclosure 1510 including a number of hard drive bays 1500 and a hard drive carrier 1520 locked in a shipping position 1560 in a hard drive enclosure of the hard drive bay 1500. The layout of the hard drive bays 1500 of the system enclosure 1510 provides a user with the capability to install multiple hard drive carriers 1520 locked in the shipping position 1560 in the hard drive enclosures of the hard drive bays 1500 for shipment to the customer. Once the shipment arrives at the customer site, a system installer (a user) need only cycle a handle 1540 of each one of the hard drive carriers 1520 to move them from the shipping position 1560 to an operating position, similar to the operating position 1462 of FIG. 14. In other embodiments, greater or fewer hard drive bays 1500 are included within the system enclosure 1510. In an embodiment, each one of the hard drive bays 1500 is configured to accept only one hard drive carrier 1520, as shown in FIG. 15. In other embodiments, each hard drive bay 1500 may be configured to accept multiple hard drive carriers 1520 in a stacked arrangement. In further embodiments, the system enclosure and the hard drive bays 1500 may be configured to accept the hard drive carriers 1520 from either the front of the hard drive bays 1500 of the system enclosure 1510 or from the top of the hard drive bays 1500 of the system enclosure 1510. Hard drive carriers 1520 that are accessed via the front of the hard drive bay 1500 of the system enclosure 1510 are connected to a backplane of the hard drive enclosure of the hard drive bay 1500 in a horizontal orientation, such that the hard drive carrier 1520 translates horizontally along the hard drive enclosure to connect with the backplane. Hard drive carriers 1520 that are accessed via the top of the hard drive bay 1500 of the system enclosure 1510 are connected to a backplane of the hard drive enclosure of the hard drive bay 1500 in a vertical orientation, such that the hard drive carrier 1520 translates vertically along the hard drive enclosure to connect with the backplane. In all of these embodiments, the hard drive carriers 1520 may be inserted and installed in a shipping position similar to the shipping position 1560, and in an operating position similar to the operating position 1462.

Figure 16:
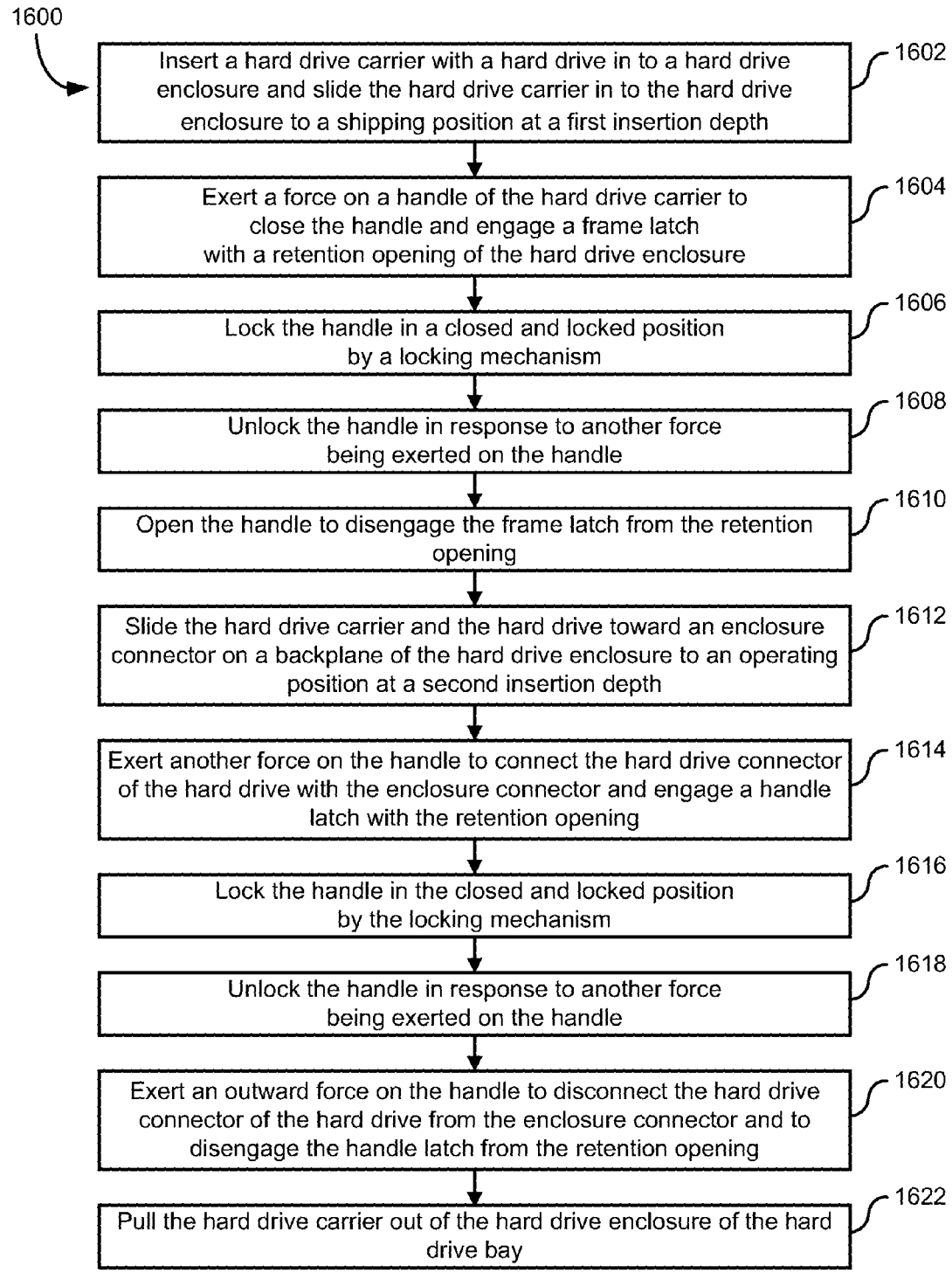
FIG. 16 is a flow diagram of a method for installing a hard drive carrier in a hard drive enclosure of a hard drive bay locked in a shipping position and locked in an operating position according to an embodiment of the present disclosure.

FIG. 16 shows a flow diagram of a method 1600 for installing a hard drive carrier in a hard drive enclosure of a hard drive bay locked in a shipping position and locked in an operating position.

At block 1602, insert a hard drive carrier with a hard drive in to a hard drive enclosure of a hard drive bay and slide the hard drive carrier in to the hard drive enclosure to a shipping position at a first insertion depth. Exert a force on a handle of the hard drive carrier to close the handle and engage a frame latch with a retention opening of the hard drive enclosure at block 1604. At block 1606, lock the handle in a closed and locked position by a locking mechanism. The locking mechanism can be a lock knob at the head of the handle that snap fits within a recess of the front of the hard drive carrier, can be a push/push trigger lock, and the like. At this position, the hard drive carrier is locked in the hard drive enclosure in the shipping position, where a hard drive connector of the hard drive is prevented from coming into physical contact with an enclosure connector on a backplane of the hard drive enclosure.

At block 1608, unlock the handle in response to another force being exerted on the handle. Open the handle to disengage the frame latch from the retention opening at block 1610.

At block 1612, slide the hard drive carrier and the hard drive toward an enclosure connector on a backplane of the hard drive enclosure to an operating position at a second insertion depth. Exert another force on the handle to connect the hard drive connector of the hard drive with the enclosure connector and engage a handle latch with the retention opening at block 1614.

Lock the handle in the closed and locked position by the locking mechanism at block 1616. At this position, the hard drive carrier is locked in the hard drive enclosure in the operating position. At block 1618, unlock the handle in response to another force being exerted on the handle.

Exert an outward force on the handle to disconnect the hard drive connector of the hard drive from the enclosure connector and to disengage the handle latch from the retention opening at block 1620.

At block 1622, pull the hard drive carrier out of the hard drive enclosure of the hard drive bay.

Although only a few exemplary embodiments have been described in detail above, those skilled in the art will readily appreciate that many modifications are possible in the exemplary embodiments without materially departing from the novel teachings and advantages of the embodiments of the present disclosure. For example, the methods described in the present disclosure can be stored as instructions in a computer readable medium to cause a processor to perform the method. Additionally, the methods described in the present disclosure can be stored as instructions in a non-transitory computer readable medium, such as a disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A hard drive carrier comprising:
   a frame to receive a hard drive, the frame including a front and a side; and
   a handle connected to the front;

the hard drive carrier being configured to:
engage with a hard drive bay of a system enclosure to hold the hard drive carrier in the hard drive bay at a first insertion depth when the handle is in a closed position, the first insertion depth being configured to prevent a hard drive connector of the hard drive from engaging with an enclosure connector on a backplane of the hard drive bay;
engage with the hard drive bay to hold the hard drive carrier in the hard drive bay at a second insertion depth when the handle is in the closed position, the second insertion depth being configured to engage the hard drive connector with the enclosure connector; and
transition the hard drive carrier from the first insertion depth to the second insertion depth by moving the handle from the closed position to an open position, and then moving the handle back to the closed position.

2. A hard drive enclosure comprising:
a first retention mechanism and a second retention mechanism;
a backplane including an enclosure connector on the backplane; and
the hard drive enclosure being configured to receive a hard drive carrier, the hard drive carrier comprising:
a frame to receive a hard drive, the frame including a front; and
a handle connected to the front, the handle including a handle latch;
the first retention mechanism being configured to engage with the handle latch of the hard drive carrier to hold the hard drive carrier in the hard drive enclosure at a first insertion depth when the handle is in a closed position, the first insertion depth being selected to prevent a hard drive connector of the hard drive from engaging with the enclosure connector; and
the second retention mechanism being configured to engage with the handle latch to hold the hard drive carrier in the hard drive enclosure at a second insertion depth when the handle is in the closed position, the second insertion depth being selected to engage the hard drive connector with the enclosure connector.

3. The hard drive carrier of claim 1, wherein:
the frame further includes a frame latch connected to the side, the frame latch being configured to engage with a retention mechanism of the hard drive bay to hold the hard drive carrier in the hard drive bay at the first insertion depth; and
the handle further includes a handle latch, the handle latch being configured to engage with the retention mechanism of the hard drive bay to hold the hard drive carrier in the hard drive bay at the second insertion depth.

4. The hard drive carrier of claim 3, wherein the frame latch is configured to automatically snap fit to the retention mechanism when the hard drive carrier is inserted in to the hard drive bay to the first insertion depth when the handle is in the closed position.

5. The hard drive carrier of claim 3, wherein the handle latch is further configured to engage with a front surface of the hard drive bay at the first insertion depth to prevent the hard drive carrier from being inserted in to the hard drive bay beyond the first insertion depth when the handle is in the closed position.

6. The hard drive carrier of claim 3, wherein the first insertion depth is at a depth where the handle latch does not come into physical contact with a front surface of the hard drive bay when the handle is in the closed position.

7. The hard drive carrier of claim 3, wherein the handle is further configured to engage with the frame latch, when the handle is in an open position, to disengage the frame latch from the retention mechanism and allow the hard drive carrier to be moved to the second insertion depth.

8. The hard drive carrier of claim 3, wherein the handle is further configured to disengage the hard drive connector from the enclosure connector and disengage the handle latch from the retention mechanism, when the handle is in an open position, to allow the hard drive carrier to be removed from the hard drive bay.

9. The hard drive carrier of claim 3, further comprising a ramp leading up to the retention mechanism, the ramp to allow the frame latch to operate independent of the handle and the handle latch.

10. The hard drive carrier of claim 3, wherein the frame latch is one of a sheet metal spring clip, a plunger, and a sliding pin.

11. The hard drive carrier of claim 1, wherein the enclosure connector is one of a surface mount connector and a through-hole connector.

12. The hard drive carrier of claim 1, wherein the first insertion depth is less than the second insertion depth.

13. The hard drive carrier of claim 1, wherein the handle further includes a handle latch configured to:
engage with a first retention mechanism of the hard drive bay to hold the hard drive carrier in the hard drive bay at the first insertion depth when the handle is in the closed position; and
engage with a second retention mechanism of the hard drive bay to hold the hard drive carrier in the hard drive bay at the second insertion depth when the handle is in the closed position.

14. A hard drive bay comprising:
a backplane;
a hard drive enclosure including an enclosure connector on the backplane; and
a hard drive carrier including:
a frame to receive a hard drive, the frame including a front and a side; and
a handle connected to the front;
wherein the hard drive carrier:
engages with the hard drive enclosure to hold the hard drive carrier in the hard drive enclosure at a first insertion depth when the handle is in a closed position, the first insertion depth preventing a hard drive connector of the hard drive from engaging with the enclosure connector;
engages with the hard drive enclosure to hold the hard drive carrier in the hard drive enclosure at a second insertion depth when the handle is in the closed position, the second insertion depth engaging the hard drive connector with the enclosure connector; and
transitions from the first insertion depth to the second insertion depth by moving the handle from the closed position to an open position, and then moving the handle back to the closed position.

15. The hard drive bay of claim 14, wherein:
the frame further includes a frame latch connected to the side, the frame latch configured to engage with a retention mechanism of the hard drive enclosure to hold the hard drive carrier in the hard drive enclosure at the first insertion depth; and the handle further includes a handle latch, the handle latch configured to engage with the retention mechanism of the hard drive enclosure to hold the hard drive carrier in the hard drive enclosure at the second insertion depth.

16. The hard drive bay of claim 15, further comprising:
a ramp leading up to the retention mechanism, the ramp to allow the frame latch to operate independent of the handle and the handle latch.

17. The hard drive bay of claim 15, wherein
the frame latch is configured to automatically snap fit to the retention mechanism when the hard drive carrier is inserted in to the hard drive enclosure to the first insertion depth when the handle is in the closed position.

18. The hard drive bay of claim 15, wherein
the handle latch is further configured to engage with a front surface of the hard drive enclosure at the first insertion depth to prevent the hard drive carrier from being inserted in to the hard drive enclosure beyond the first insertion depth when the handle is in the closed position.

\* \* \* \* \*